US012100034B2

(12) United States Patent
Subramanian et al.

(10) Patent No.: US 12,100,034 B2
(45) Date of Patent: Sep. 24, 2024

(54) METHODS AND SYSTEMS FOR PROVIDING A VEHICLE RECOMMENDATION

(71) Applicant: Capital One Services, LLC, McLean, VA (US)

(72) Inventors: Ponnazhakan Subramanian, McKinney, TX (US); Sasi Kumar Unnikrishnan, Plano, TX (US); Satish Chikkaveerappa, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 3 days.

(21) Appl. No.: 17/696,003

(22) Filed: Mar. 16, 2022

(65) Prior Publication Data

US 2022/0207589 A1  Jun. 30, 2022

Related U.S. Application Data

(63) Continuation of application No. 16/711,798, filed on Dec. 12, 2019, now Pat. No. 11,282,127.

(51) Int. Cl.
*G06Q 30/0601* (2023.01)
*G06Q 40/02* (2023.01)

(52) U.S. Cl.
CPC ..... *G06Q 30/0631* (2013.01); *G06Q 30/0611* (2013.01); *G06Q 30/0625* (2013.01); *G06Q 40/02* (2013.01)

(58) Field of Classification Search
CPC ........... G06Q 30/0631; G06Q 30/0611; G06Q 30/0625; G06Q 40/02; G06Q 30/0601–0645

USPC ...................................... 705/26.7, 26.1–27.2
See application file for complete search history.

(56) References Cited

U.S. PATENT DOCUMENTS

| 7,392,215 | B1 |  | 6/2008  | Bril |  |
|---|---|---|---|---|---|
| 8,825,505 | B1 |  | 9/2014  | Alava |  |
| 10,650,432 | B1 | * | 5/2020  | Joseph | ..................... G06N 3/08 |
| 10,810,656 | B1 | * | 10/2020 | McCroskey | ....... G06Q 30/0641 |
| 11,631,127 | B1 | * | 4/2023  | Brandt | ................ H04M 3/5183 |
|  |  |  |  |  | 705/38 |

(Continued)

OTHER PUBLICATIONS

Price Forecasting: Using ML for Electricity, Flights, Hotels, Real Estate, and Stock Pricing, AltexSoft, Feb. 26, 2019 (Year: 2019).*

(Continued)

*Primary Examiner* — Marissa Thein
(74) *Attorney, Agent, or Firm* — Bookoff McAndrews, PLLC

(57) ABSTRACT

A computer-implemented method for determining a reward associated with one or more transactions of a user may comprise obtaining travel data of the user via a device associated with the user, wherein the travel data includes travel dates of the user; obtaining, via one or more processors, exchange rate data based on the travel data of the user; determining, via the one or more processors, a value of the reward associated with the one or more transactions of the user during the travel dates based on the exchange rate data; transmitting, to the user, a notification indicative of the reward associated with the one or more transactions; and causing the reward associated with the one or more transactions to be directed to a financial account associated with the user.

20 Claims, 4 Drawing Sheets

(56) References Cited

U.S. PATENT DOCUMENTS

| | | | |
|---|---|---|---|
| 2002/0082978 A1 | 6/2002 | Ghouri et al. | |
| 2004/0193489 A1* | 9/2004 | Boyd | G06Q 30/0241 |
| | | | 705/14.27 |
| 2014/0032259 A1 | 1/2014 | LaFever | |
| 2015/0371298 A1 | 12/2015 | Xu | |
| 2017/0287043 A1* | 10/2017 | Swinson | G06F 16/904 |
| 2018/0158039 A1 | 6/2018 | Cox | |
| 2019/0235923 A1 | 8/2019 | Collins | |
| 2020/0104288 A1 | 4/2020 | Tao | |

OTHER PUBLICATIONS

Youssef Fenjiro, Machine Learning For Banking: Loan Approval Use Case, Medium, Jul. 24, 2018.
Edmunds.com Helps Car Shoppers Stick To A Budget, Business Wire, Jun. 5, 2009.

* cited by examiner

METHODS AND SYSTEMS FOR PROVIDING A VEHICLE RECOMMENDATION

CROSS-REFERENCE TO RELATED APPLICATION(S)

This patent application is a continuation of and claims the benefit of priority to U.S. Nonprovisional patent application Ser. No. 16/711,798, filed on Dec. 12, 2019, the entirety of which is incorporated herein by reference.

TECHNICAL FIELD

Various embodiments of the present disclosure relate generally to analysis of transactional data, purchasing power data, and sales data, and, more particularly, to providing a vehicle recommendation to a user based on the analysis of transactional data, purchasing power data, and sales data.

BACKGROUND

It can be difficult for a user who wants to purchase a vehicle to know the final price or cost (e.g., monthly payment) for financing of the vehicle via publicly available sources (e.g., dealer websites). Usually, the user may need to visit multiple vehicle dealers and negotiate the price face-to-face with these vehicle dealers to purchase a vehicle at an affordable price. Additionally, it may be difficult for a user to determine which vehicle the user can realistically afford according to a monthly payment amount based only on a length of a financing period. Indeed, the user may have other loans or obligations for which they are responsible that would not be accounted for in a monthly payment amount based only on a length of a financing period.

The present disclosure is directed to addressing the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for providing a vehicle recommendation for a user.

In one aspect, a computer-implemented method for providing a vehicle recommendation for a user may include obtaining, via one or more processors, transactional data of the user from one or more transactional entities, wherein the transactional data includes at least one of a salary or a spending pattern of the user; determining, via the one or more processors, purchasing power data of the user based on the transactional data, wherein the purchasing power data includes at least one of a net monthly income, a monthly payment range, or a vehicle price range; obtaining, via the one or more processors, sales data of one or more vehicles, wherein the sales data of the one or more vehicles includes sale prices of the one or more vehicles; comparing, via the one or more processors, the purchasing power data and the sales data; determining, via the one or more processors, the vehicle recommendation based on the comparison between the purchasing power data and the sales data; and transmitting, to the user, a notification indicating the vehicle recommendation.

In another aspect, a computer-implemented method for providing a vehicle recommendation for a user may include obtaining, via one or more processors, transactional data of the user from one or more transactional entities, wherein the transactional data includes at least one of a salary or a spending pattern of the user; determining, via the one or more processors, purchasing power data of the user based on the transactional data, wherein the purchasing power data includes at least one of a net monthly income, a monthly payment range, or a vehicle price range; determining, via the one or more processors, bidding data based on the purchasing power data using a trained machine learning model, wherein the bidding data includes at least one of a bidding starting price, a bidding real-time price, a bidding increment period, or a bidding increment amount; obtaining, via the one or more processors, sales data of one or more vehicles, wherein the sales data of the one or more vehicles includes sale prices of the one or more vehicles; comparing, via the one or more processors, the bidding data and the sales data during a predetermined bidding period; determining, via the one or more processors, the vehicle recommendation based on the comparison between the bidding data and the sales data; and transmitting, to the user, a notification indicating the vehicle recommendation.

In yet another aspect, a computer system for providing a vehicle recommendation to a user may include a memory storing instructions; and one or more processors configured to execute the instructions to perform operations. The operations may include: obtaining transactional data of the user from one or more transactional entities, wherein the transactional data includes at least one of a salary or a spending pattern of the user; determining purchasing power data of the user based on the transactional data, wherein the purchasing power data includes at least one of a net monthly income, a monthly payment range, or a vehicle price range; obtaining sales data of one or more vehicles, wherein the sales data of the one or more vehicles includes sale prices of the one or more vehicles; comparing the purchasing power data and the sales data; determining the vehicle recommendation based on the comparison between the purchasing power data and the sales data; and transmitting, to the user, a notification indicating the vehicle recommendation.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, data such as transactional data, purchasing power data, sales data, or bidding data may be used to determine a vehicle recommendation for a user. Transactional data, purchasing power data, sales data, or bidding data of customers other than the user may also be used to predict the vehicle recommendation for the user.

Figure 1:
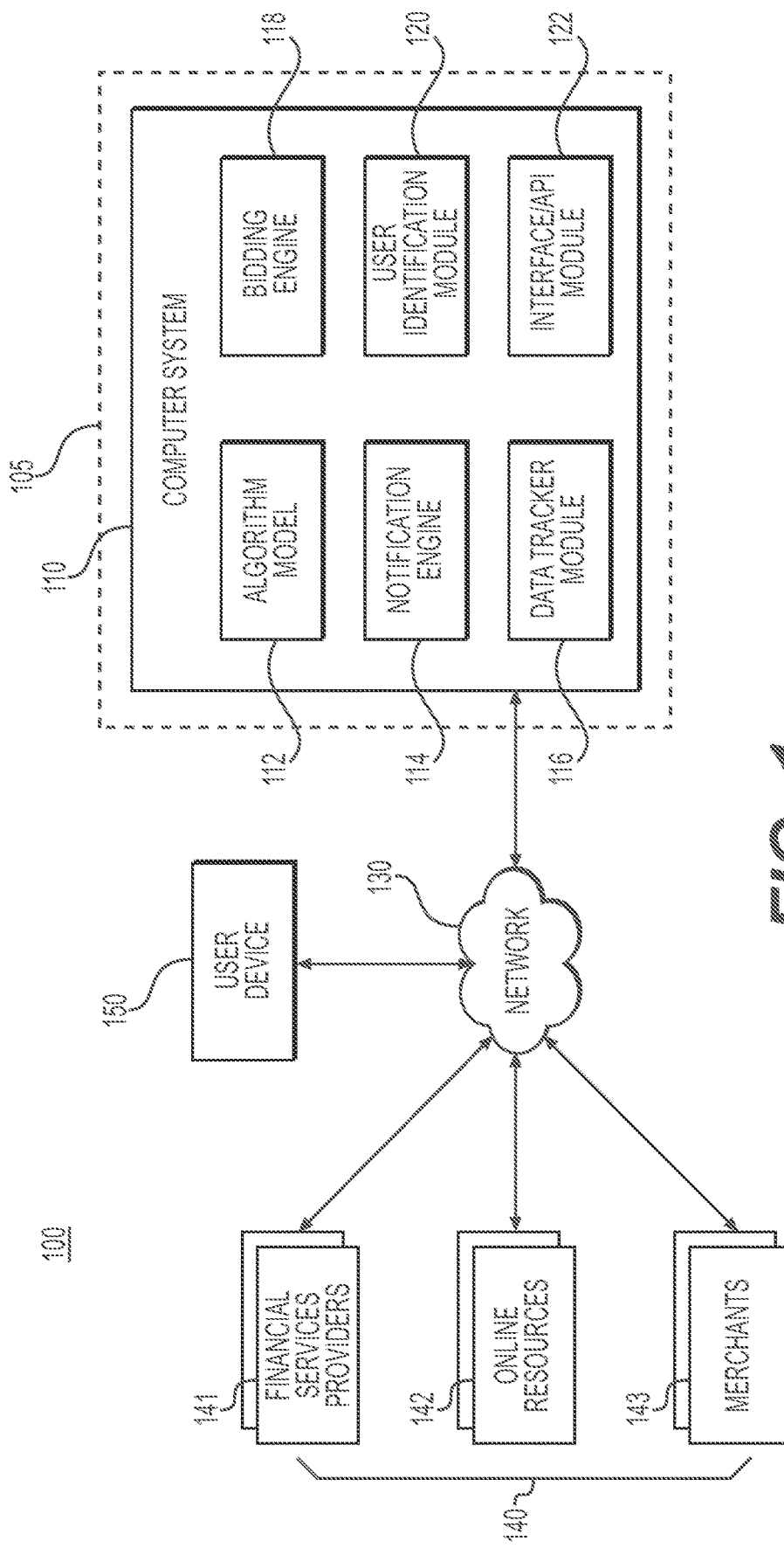
FIG. 1 depicts an exemplary system infrastructure, according to one or more embodiments.

FIG. 1 is a diagram depicting an example of a system environment 100 according to one or more embodiments of the present disclosure. The system environment 100 may include a computer system 110, a network 130, one or more resources for collecting data (e.g., transactional data, purchasing power data, or sales data) 140, and a user device (or a device associated with a user) 150. The one or more resources for collecting data 140 may include financial services providers 141, online resources 142, and merchants 143. These components may be in communication with one another via the network 130.

The computer system 110 may have one or more processors configured to perform methods described in this disclosure. The computer system 110 may include one or more modules, models, or engines. The one or more modules, models, or engines may include an algorithm model 112, a notification engine 114, a data tracker module 116, a bidding engine 118, a user identification module 120, and/or an interface/API module 122, which may each be software components stored in/by the computer system 110. The computer system 110 may be configured to utilize one or more modules, models, or engines when performing various methods described in this disclosure. In some examples, the computer system 110 may have a cloud computing platform with scalable resources for computation and/or data storage, and may run one or more applications on the cloud computing platform to perform various computer-implemented methods described in this disclosure. In some embodiments, some of the one or more modules, models, or engines may be combined to form fewer modules, models, or engines. In some embodiments, some of the one or more modules, models, or engines may be separated into separate, more numerous modules, models, or engines. In some embodiments, some of the one or more modules, models, or engines may be removed while others may be added.

The algorithm model 112 may be a plurality of algorithm models. The algorithm model 112 may include a trained machine learning model. Details of algorithm model 112 are described elsewhere herein. The notification engine 114 may be configured to generate and communicate (e.g., transmit) one or more notifications (e.g., the vehicle recommendation) to a user device 150 or to one or more resources 140 via network 130. The data tracker module 116 may be configured to retrieve, store, or otherwise aggregate or manage current or historical data (e.g., transactional data, purchasing power data, bidding data, or sales data) from the one or more resources 140. The data tracker module 116 may be configured to clean, process, or standardize data (e.g., transactional data) received by the computer system 110. One or more algorithms may be used to clean, process, or standardize the data. The bidding engine 118 may be configured to perform the bidding process described elsewhere herein. The user identification module 120 may manage or authenticate identification data from transactional data or any information regarding a user for each user accessing the computer system 110. In one implementation, the identification data associated with each user may be stored to, and retrieved from, one or more components of the data storage associated with the computer system 110 or one or more resources 140. The interface/API module 122 may allow the user to interact with one or more modules, models, or engines of the computer system 110.

Computer system 110 may be configured to receive data from other components (e.g., one or more resources 140, or user device 150) of the system environment 100 via network 130. Computer system 110 may further be configured to utilize the received data by inputting the received data into the algorithm model 112 to produce a result (e.g., the vehicle recommendation). Information indicating the result may be transmitted to user device 150 or one or more resources 140 over network 130. In some examples, the computer system 110 may be referred to as a server system that provides a service including providing the information indicating the received data and/or the result to one or more resources 140 or user device 150.

Network 130 may be any suitable network or combination of networks and may support any appropriate protocol suitable for communication of data to and from the computer system 110 and between various other components in the system environment 100. Network 130 may include a public network (e.g., the Internet), a private network (e.g., a network within an organization), or a combination of public and/or private networks. Network 130 may be configured to provide communication between various components depicted in FIG. 1. Network 130 may comprise one or more networks that connect devices and/or components in the network layout to allow communication between the devices and/or components. For example, network 130 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 130 may be implemented using cell and/or pager networks, satellite, licensed radio, or a combination of licensed and unlicensed radio.

Financial services providers 141 may be an entity such as a bank, credit card issuer, merchant services providers, or other type of financial service entity. In some examples, financial services providers 141 may include one or more merchant services providers that provide merchants 143 with the ability to accept electronic payments, such as payments using credit cards and debit cards. Therefore, financial services providers 141 may collect and store transactional data pertaining to transactions occurring at the merchants 143.

Online resources 142 may include webpage, e-mail, apps, or social network sites. In details, online resources 142 may include electronic transaction data (e.g., receipts) held by a user or other parties. Online resources 142 may be provided by manufacturers, retailers, consumer promotion agencies, and other entities. Online resources 142 may include other computer systems, such as web servers, that are accessible by computer system 110.

Merchants 143 may each be an entity that provides products. In this disclosure, the term "product," in the context of products offered by a merchant, encompasses both goods and services, as well as products that are a combination of goods and services. A merchant may be, for example, a vehicle dealer, a retailer, a grocery store, an entertainment venue, a service provider, a restaurant, a bar, a non-profit organization, or other type of entity that provides products that a consumer may consume. A merchant 143 may have one or more venues that a consumer physically visits in order to obtain the products (goods or services) offered by the merchant.

The merchants 143 and financial services providers 141 may each include one or more computer systems configured to gather, process, transmit, and/or receive data. In general, whenever any of the merchants 143 and financial services providers 141 is described as performing an operation of gathering, processing, transmitting, or receiving data, it is understood that such operation may be performed by a computer system thereof. In general, a computer system may include one or more computing devices, as described in FIG. 4 below.

A user device 150 may operate a client program, also referred to as a user application or third-party application, used to communicate with the computer system 110. This user application may be used to provide information to the computer system 110 and to receive information from the computer system 110. In some examples, the user application may be a mobile application that is run on the user device 150. The user device 150 may be a mobile device (e.g., smartphone, tablet, pager, personal digital assistant (PDA)), a computer (e.g., laptop computer, desktop computer, server), or a wearable device (e.g., smartwatches). A user device 150 can also include any other media content player, for example, a set-top box, a television set, a video game system, or any electronic device capable of providing or rendering data. The user device 150 may optionally be portable. The user device may be handheld. The user device 150 may be a network device capable of connecting to a network, such as the network 130, or other networks such as a local area network (LAN), wide area network (WAN) such as the Internet, a telecommunications network, a data network, or any other type of network. The user device 150 may be capable of transmitting information indicating a current location of the user device 150. For example, a user device 150 may have an application configured to transmit data indicating a current location of the user device 150 to computer system 110. The user device 150 may determine its location based on data obtained by a GPS included in the user device 150 and/or other location estimation techniques.

Computer system 110 may be part of entity 105, which may be any type of company, organization, or institution. In some examples, the entity 105 may be a financial services provider. In such examples, the computer system 110 may have access to data pertaining to consumer transactions through a private network within the entity 105. For example, if the entity 105 is a card issuer, entity 105 may collect and store transactions involving a credit card or debit card issued by the entity 105. In such examples, the computer system 110 may still receive transactional data from other financial services providers 141.

Figure 2:
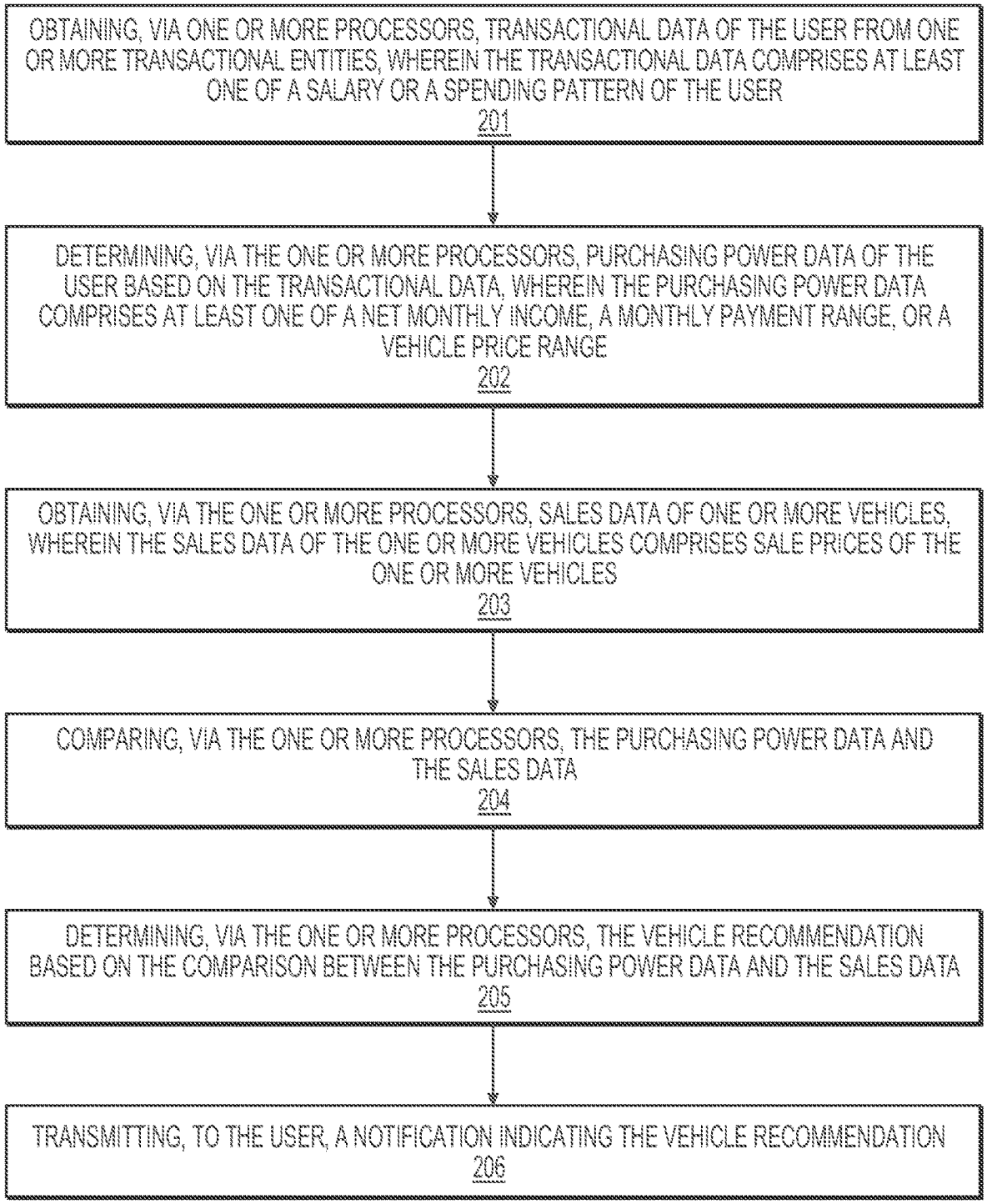
FIG. 2 depicts a flowchart of an exemplary method of providing a vehicle recommendation to a user, according to one or more embodiments.

FIG. 2 is a flowchart illustrating a method for providing a vehicle recommendation to a user, according to one or more embodiments of the present disclosure. The method may be performed by computer system 110.

Step 201 may include obtaining, via one or more processors, transactional data of the user from one or more transactional entities. The transactional data may include at least one of a salary or a spending pattern of the user. The spending pattern of the user may include any information regarding a user's expenditure during a predetermined period of time. The predetermined period of time may be at most one year, one quarter, one month, one week or shorter. In some embodiments, the predetermined period of time may be at least one week, one month, one quarter, one year or longer. The transactional data may further include a debt, a loan, an additional income, or a credit score of the user. The additional income may be any income obtained outside the user's employment, including, but not limited to, stock profit, mutual fund profit, pension, or retirement plan. The credit score may be obtained by monitoring the credit information of the user manually or automatically via one or more credit monitoring agencies. The credit score may be obtained via any procedures, such as a hard pull or a soft pull.

The transactional data of the user may include any information regarding a transaction performed by the user, for example, a user name and/or identifier, contact information (e.g., address, phone numbers, e-mail addresses, etc.), demographic information (e.g., age, gender, marital status, income level, educational background, number of children in household, etc.), user preferences (preferences or reviews regarding favorite products and/or services, favorite department stores, etc.), a transaction amount, and previous transaction data. The previous transaction data may include a time of a transaction, a location of a transaction, past spending levels on goods sold by various manufacturers or merchants, a frequency of shopping by the user at one or more merchants, store loyalty exhibited by the user, how much the user spends in an average transaction, how much the user has spent on a particular basket of goods, how often the user shops in a particular store or kind of merchant, an estimated profit margin on goods previously purchased, distances the user has traveled to purchase products in past outings, or online or offline stores at which the user has purchased items. The one or more transactional entities may include one or more merchants (e.g., merchants 143) including one or more vehicle dealers, financial services providers (e.g., financial services providers 141, or online resources (e.g., online resources 140). Details of one or more merchants, financial services providers, or online resources are described elsewhere herein.

Prior to obtaining the transactional data of the user, or at any stage of providing a vehicle recommendation to a user, the method may further include, authenticating a user identification of the user. The authenticating the user identification may be initiated when identification data of the user is obtained. The identification data may include at least a password, a user name, or biometric data of the user. The biometric data of the user may include any information related to human characteristics of the user. The biometric data may include physiological information such as a fingerprint, palm veins, face recognition, DNA, palm print, hand geometry, iris recognition, retina or odor/scent. The biometric data may also include behavioral characteristics related to the pattern of behavior of the user, including but not limited to typing rhythm, gait, or voice. The identification data of the user may further include an actual name, contact information (e.g., address, phone numbers, e-mail addresses, etc.), a social security number, and additional information pertaining to the user. The additional information may include user preference information, demographic information (e.g., age, gender, marital status, income level, educational background, number of children in household, etc.), employment, and other data related to the user.

The authenticating the user may include comparing the identification data of the user to a pre-stored identification. During the authenticating process, one or more algorithms may be used to compare the identification data of the user to a pre-stored identification and determine whether there is a match (e.g., a complete match or a match equal to or exceeding a predetermined threshold of similarity) between the identification data of the user and a pre-stored identification. The process of providing a vehicle recommendation may be permitted to be completed, may be stopped, or may include additional verification processes to occur, based on whether there is a match (e.g., a complete match or a match equal to or exceeding a predetermined threshold of similarity) between the identification data of the user and a pre-stored identification.

The pre-stored identification may be generated when a user device (e.g., user device 150) is registered with a transaction system, an authentication system, or a transactional entity. In other embodiments, the pre-stored identification may be generated when a user device first connects with a transaction system, an authentication system, or a transactional entity. If the user device is an electronic mobile device, the pre-stored identification may be generated when a mobile application for authenticating identification is downloaded, installed, or running on the user device for the first time. If the user device is a card, the pre-stored identification may be generated when information of a card is registered or entered by a user through an electronic device (e.g., a phone, a computer, etc.). The pre-stored identification may be generated when a user account is registered with a transaction system, an authentication system, or a transaction entity, and the pre-stored identification may correspond to the user device used for registration of the user account. Once the pre-stored identification has been generated, it may be stored with other user account information and/or authentication information. The pre-stored identification may be stored in one or more memory units, cookies, caches, browsing histories, and/or browser fingerprints. The pre-stored identification may be stored in a memory on-board the reader or on-board the user device. The pre-stored identification may be distributed over multiple devices or systems (e.g., peer-to-peer, cloud-computing based infrastructure, between the reader and an external device).

Step 202 may include determining, via the one or more processors, purchasing power data of the user based on the transactional data. The purchasing power data may comprise at least one of a net monthly income, a monthly payment range, or a vehicle price range. The net monthly income may be the monetary value that is equal to the monthly income of the user minus the monthly expenditure of the user. The expenditure of the user may include a debt or a loan of the user. The monthly payment range may be lower than the net monthly income. The vehicle price range may include a monthly price that is determined to be one the user is likely able to pay to purchase a product (e.g., vehicle). In some embodiments, the vehicle price range may include a monthly price that is determined to be financially prudent or responsible given a user's particular stated budget/savings goals or generally accepted financial planning principles relevant to the user's position. For example, financial services providers may provide a smart financial assistant (e.g., an app or platform that a user can interact with) to help a user save and/or control the user's expenditure. In this situation, data (e.g., transactional data) obtained via the smart financial assistant may be used and/or analyzed to determine the monthly price. In another example, the purchasing power data may further include, or may be determined by, demographic information of the user. The demographic information may include age, gender, race, ethnicity, marital status, income level, educational background, or number of children in household. One or more algorithms may be used to determine the purchasing power data. Details of the one or more algorithms are described elsewhere herein.

Step 203 may include obtaining, via the one or more processors, sales data of one or more vehicles. The sales data of the one or more vehicles may include sale prices of the one or more vehicles. The sales data of the one or more vehicles may include any information regarding selling or purchasing one or more vehicles, including a monthly installment price to purchase the vehicle. The sales data of the one or more vehicles may further include one or more dealer identifications associated with the one or more vehicle dealers. The dealer identifications may include at least one of a dealer name or a dealer address of the one or more vehicle dealers. The dealer identifications may further include contact information (e.g., phone numbers, e-mail addresses, etc.) or additional information pertaining to the one or more vehicle dealers. The additional information pertaining to the vehicle dealers may include reviews or photos of the one or more vehicle dealers.

Step 204 may include comparing, via the one or more processors, the purchasing power data and the sales data. The comparing the purchasing power data and the sales data may include matching the purchasing power data and the sales data. For instance, if the purchasing power data includes the vehicle price range and the sales data includes the sales prices of the one or more vehicles, comparing the purchasing power data and the sales data may include comparing or matching (e.g., matching so as to satisfy a predetermined threshold of similarity) the vehicle price range and the sale prices of the one or more vehicles to check whether the sales prices fall in the vehicle price range. In another example, if the purchasing power data includes the monthly payment range and the sales data includes the monthly payment to purchase the one or more vehicles, comparing the purchasing power data and the sales data may include comparing or matching (e.g., matching so as to satisfy a predetermined threshold of similarity) the monthly payment range and the monthly payment to purchase the one or more vehicles to check whether the monthly payment to purchase falls in (e.g., is encompassed by/within) the monthly payment range. In yet another example, purchasing power data may be personalized for each user based on transactional data (e.g., a personalized monthly payment with a personalized annual percentage rate may be calculated for each user based on the transactional data of the user and/or a monthly payment goal set by the user), and the sales data for each vehicle may also be personalized for each user based on the transactional data or purchasing power data of the user (e.g., for each user, an actual personalized monthly payment with an actual personalized annual percentage rate may be calculated for each vehicle). In this situation, comparing the purchasing power data and the sales data may include comparing the personalized purchasing power data and personalized sales data. Based on such comparison, the user may be able to search for a vehicle that meets his/her monthly payment goal and/or needs (e.g., term, down payment, etc.).

Step 205 may include determining, via the one or more processors, the vehicle recommendation based on the comparison between the purchasing power data and the sales data. The vehicle recommendation may include any information regarding one or more recommended vehicles that represent a match (e.g., a complete match or a match equal to or exceeding a predetermined threshold of similarity) between the purchasing power data and the sales data. The vehicle recommendation may include images, prices, modes, makes, years of manufacturing, mileages, colors of the one or more recommended vehicles. The vehicle recommendation may also include any information regarding the one or more dealers who sell the recommended vehicles, including, but not limited to, the names of the dealers, contact information of the dealers, or the addresses of the dealers. The vehicle recommendation may also include any information regarding purchasing a vehicle by the user, for example, a recommended location to purchase the vehicle, or a recommended time to purchase the vehicle. The vehicle recommendation may include upgrade or repair information specific to the vehicle, news articles pertaining to the vehicle, possible substitute or compatible items for the vehicle, and so forth. Although a vehicle recommendation is described herein as an example, it is understood that the methods of the present disclosure can be utilized to provide recommendations for other products. The product may be any item or service sold by a merchant (e.g., merchants 141). One or more algorithms may be used to generate the recommendation (e.g., vehicle recommendation). The one or more algorithms may include a trained machine learning algorithm.

At any stage of providing a vehicle recommendation to a user, the method may further include storing the vehicle recommendation for subsequent analysis. The stored vehicle recommendation may have an expiration period. The expiration period may be at least 1 day, 1 week, 1 month, 1 quarter, 1 year or longer. In other embodiments, the expiration period may be at most 1 year, 1 quarter, 1 month, 1 week, 1 day or shorter. The subsequent analysis may include analyzing the vehicle recommendation to update the transactional data, the purchasing power data, or the sales data. The vehicle recommendation may also be one of the one or more variables used in training a trained machine learning model. Details of the trained machine learning model are described elsewhere herein.

Step 206 may include transmitting, to the user, a notification indicating the vehicle recommendation. The notification may include any information associated with the vehicle recommendation. The notification may be configured to be displayed on a display screen of a user device associated with the user (e.g., user device 150). The notification may be displayed on the display screen in any suitable form, such as an e-mail, a text message, a push notification, content on a web page, and/or any form of graphical user interface. The user device 150 may be capable of accepting inputs of a user via one or more interactive components of the user device 150, such as a keyboard, button, mouse, touchscreen, touchpad, joystick, trackball, camera, microphone, or motion sensor.

At any stage of providing a vehicle recommendation to a user, the method may further include transmitting, to the one or more vehicle dealers, the notification indicating the vehicle recommendation. The notification may include any information associated with the vehicle recommendation and the user. The notification may be configured to be displayed on a display screen of a device associated with the one or more vehicle dealers. The notification may be displayed on the display screen in any suitable form, such as an e-mail, a text message, a push notification, content on a web page, and/or any form of graphical user interface. The device associated with the one or more vehicle dealers may be capable of accepting inputs of the one or more vehicle dealers via one or more interactive components of the user device 150, such as a keyboard, button, mouse, touchscreen, touchpad, joystick, trackball, camera, microphone, or motion sensor. The inputs of the one or more vehicle dealers or the user may include any communication between the one or more vehicle dealers and the user, for example, a further negotiation of price of the recommended vehicle.

Figure 3:
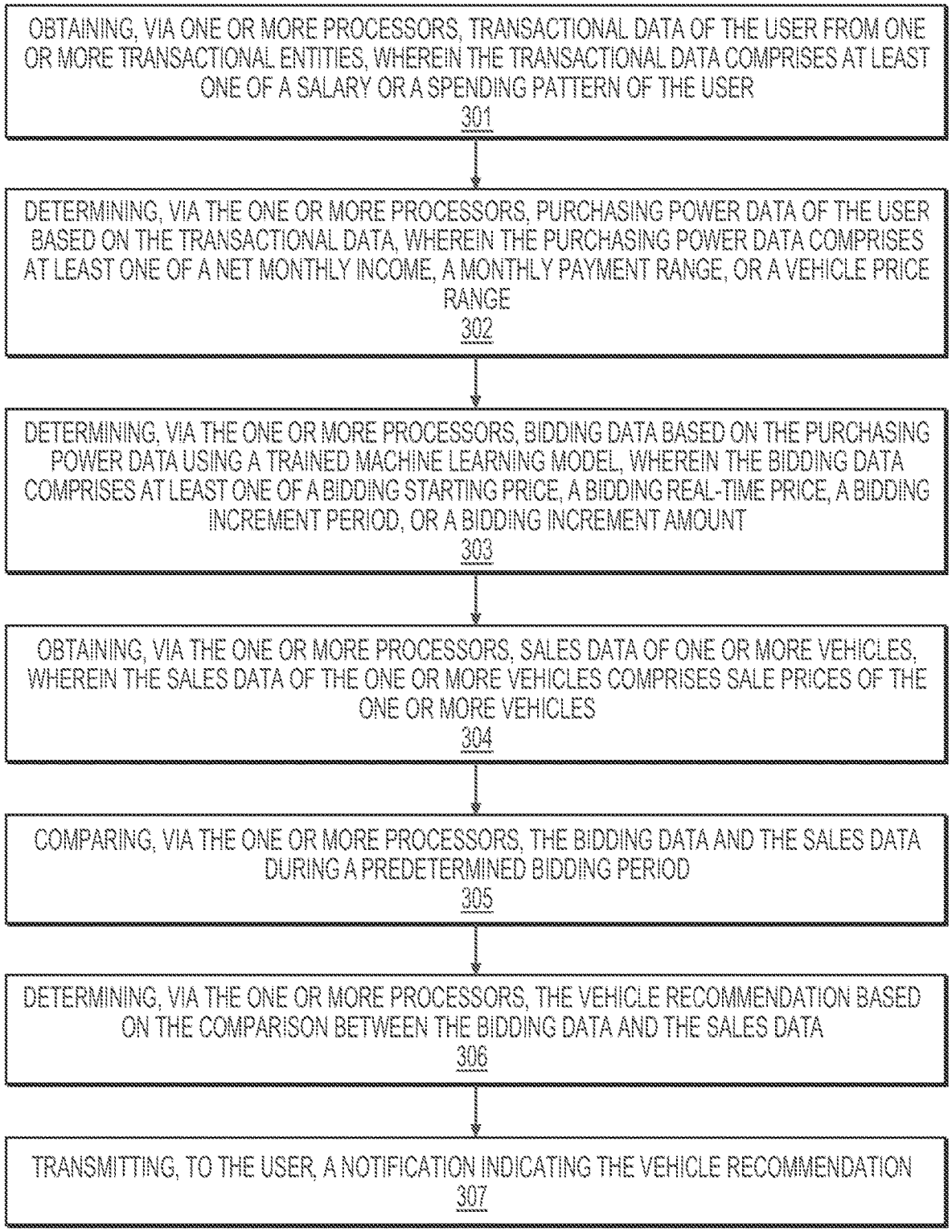
FIG. 3 depicts a flowchart of another exemplary method of providing a vehicle recommendation to a user, according to one or more embodiments.

FIG. 3 is a flowchart illustrating another exemplary method for providing a vehicle recommendation for a user, according to one or more embodiments of the present disclosure. The method may be performed by computer system 110.

Step 301, similar to step 201, may include obtaining, via one or more processors, transactional data of the user from one or more transactional entities. The transactional data may include at least one of a salary or a spending pattern of the user. The transactional data may further include a debt, a loan, an additional income, or a credit score of the user. The one or more transactional entities may include one or more merchants including one or more vehicle dealers, financial services providers, or online resources. Details of the transactional data and transactional entities are described elsewhere herein.

Step 302, similar to step 202, may include determining, via the one or more processors, purchasing power data of the user based on the transactional data. The purchasing power data may include at least one of a net monthly income, a monthly payment range, or a vehicle price range. The purchasing power data may further include, or may be determined by, demographic information of the user. The determining the purchasing power data may include analyzing the transactional data via one or more algorithms. For instance, transactional data such as a monthly income and a monthly debt may be analyzed by the one or more algorithms, and the purchasing power data may be defined by the one or more algorithms as the difference between the monthly income and the monthly debt. Details of the purchasing power data and the one or more algorithms are described elsewhere herein.

Step 303 may include determining, via the one or more processors, bidding data based on the purchasing power data using a trained machine learning model. The bidding data may include at least one of a bidding starting price, a bidding real-time price, a bidding increment period, or a bidding increment amount. The bidding data may further include any information pertaining to a bidding process or the user. The bidding process may last at least 1 minute, 1 hour, 1 day, 1 week, or longer. In some embodiments, the bidding process may be at most 1 week, 1 day, 1 hour, 1 minute, or shorter. The length of the bidding process may be set or changed by the user, or determined by the one or more algorithms.

The bidding starting price may be an original monetary value that a bidding process is based on. In one example, the bidding starting price may be determined based on a monthly maximum price a user can afford to purchase a vehicle. Such monthly maximum price may be determined based on the purchasing power data (e.g., the personalized purchasing power data) of the user. In this situation, the bidding starting price may be at least 5%, 10%, 20%, 30%, 40%, 50%, 60%, 70%, 80%, 90%, or more of the monthly maximum price. Alternatively, the bidding starting price may be at most 90%, 80%, 70%, 60%, 50%, 40%, 30%, 20%, 10%, 5%, or less of the monthly maximum price. Additionally, a bidding monthly real-time price (e.g., an actual monthly price a user may pay for a vehicle) cannot exceed the monthly maximum price. In another example, if the purchasing power data includes a net monthly income, the bidding starting price may be at least 5%, 10%, 20%, 30%, 40%, 50%, 60%, 70%, 80%, 90%, or more of the net monthly income. Alternatively, if the purchasing power data includes a net monthly income, the bidding starting price may be at most 90%, 80%, 70%, 60%, 50%, 40%, 30%, 20%, 10%, 5%, or less of the net monthly income. In another example, if the purchasing power data includes a vehicle price range, the bidding starting price may be at least 5%, 10%, 20%, 30%, 40%, 50%, 60%, 70%, 80%, 90%, or more of the lowest end of the vehicle price range. Alternatively, if the purchasing power data includes a vehicle price range, the bidding starting price may be at most 90%, 80%, 70%, 60%, 50%, 40%, 30%, 20%, 10%, 5%, or less of the lowest end of the vehicle price range. The bidding starting price may be determined based on transactional data of the user. For instance, if the transactional data includes a salary, the bidding starting price may be at least 5%, 10%, 20%, 30%, 40%, 50%, 60%, 70%, 80%, 90%, or more of the salary. Alternatively, if the transactional data includes a salary, the bidding starting price may be at most 90%, 80%, 70%, 60%, 50%, 40%, 30%, 20%, 10%, 5%, or less of the salary. Although the bidding starting price may be determined via a trained machine learning algorithm, in some embodiments, the bidding starting price may be set or changed by the user.

The bidding increment period may be a predetermined period of time that a bidding increment amount is added to the bidding real-time price. For instance, if the bidding increment period is 1 hour, the bidding increment amount may be added to the bidding real-time price every hour. The bidding increment period may be at least 1 minute, 1 hour, 1 day, 1 week, or longer. In some embodiments, the bidding increment period may be at most 1 week, 1 day, 1 hour, 1 minute, or shorter. The bidding increment period may be fixed, so that the bidding increment period may be a constant during the bidding process. In some embodiments, the bidding increment period may vary during the bidding process. For instance, the bidding increment period may increase every time when a bidding increment amount is added to the bidding real-time price. In this case, the first bidding increment amount may be added to the bidding real-time price 1 hour since the bidding process starts, and the second bidding increment amount may be added to the bidding real-time price 3 hours since the bidding process starts. Although the bidding increment period may be determined via a trained machine learning algorithm, in some embodiments, the bidding increment period may be set or changed by the user.

The bidding increment amount may be a monetary value added to the bidding real-time price during the bidding increment period. In one example, if the purchasing power data includes a net monthly income, the bidding increment amount may be at least 5%, 10%, 20%, 30%, 40%, 50%, 60%, 70%, 80%, 90%, or more of the net monthly income. Alternatively, if the purchasing power data includes a net monthly income, the bidding increment amount may be at most 90%, 80%, 70%, 60%, 50%, 40%, 30%, 20%, 10%, 5%, or less of the net monthly income. In another example, if the purchasing power data includes a vehicle price range, the bidding increment amount may be at least 5%, 10%, 20%, 30%, 40%, 50%, 60%, 70%, 80%, 90%, or more of the lowest end of the vehicle price range. Alternatively, if the purchasing power data includes a vehicle price range, the bidding increment amount may be at most 90%, 80%, 70%, 60%, 50%, 40%, 30%, 20%, 10%, 5%, or less of the lowest end of the vehicle price range. The bidding increment amount may be determined based on transactional data of the user. For instance, if the transactional data includes a salary, the bidding increment amount may be at least 5%, 10%, 20%, 30%, 40%, 50%, 60%, 70%, 80%, 90%, or more of the salary. Alternatively, if the transactional data includes a salary, the bidding increment amount may be at most 90%, 80%, 70%, 60%, 50%, 40%, 30%, 20%, 10%, 5%, or less of the salary. The bidding increment amount may be determined based on bidding data of the user. For instance, the bidding increment amount may be at least 5%, 10%, 20%, 30%, 40%, 50%, 60%, 70%, 80%, 90%, or more of the bidding starting price. Alternatively, the bidding increment amount may be at most 90%, 80%, 70%, 60%, 50%, 40%, 30%, 20%, 10%, 5%, or less of bidding starting price.

The bidding increment amount may be fixed during the predetermined bidding period, so that the bidding increment amount may be a constant during the predetermined bidding period. The bidding increment amount may vary based on the purchasing power data during the predetermined bidding period. For instance, the bidding increment amount may increase during every bidding increment period. In this case, the first bidding increment amount may be $1,000 during the first bidding increment period, and the second bidding increment amount may be may be $2,000 during the second bidding increment period. Although the bidding increment amount may be determined via a trained machine learning algorithm, in some embodiments, the bidding increment amount may be set or changed by the user.

The bidding real-time price may be a monetary value that is equal to the bidding starting price plus one or more bidding increment amounts after one or more bidding increment periods. For instance, if the bidding starting price is $10,000, the sum of the five bidding increment periods is 5 hours since the bidding process starts, and the bidding increment amount is $1,000 every bidding increment period, then the bidding real-time price may be $15,000. The determining the bidding data further includes adding the bidding increment amount to the bidding real-time price during the bidding increment period. For instance, if the bidding real-time price is $15,000, and the bidding increment amount is $1,000 every bidding increment period, then the bidding data may include the bidding price of $16,000. Although the bidding data may be determined via one or more algorithms, in some embodiments, the bidding data may be set or changed by the user. For instance, the user may set an upper limit to the bidding real-time price so the bidding process may be terminated if the bidding real-time price is equal to or larger than the upper limit.

Step 304, similar to step 203, may include obtaining, via the one or more processors, sales data of one or more vehicles. The sales data of the one or more vehicles may include sale prices of the one or more vehicles. The sales data of the one or more vehicles may include any information regarding selling or purchasing one or more vehicles, including a monthly installment price to purchase the vehicle. The sales data of the one or more vehicles may further include one or more dealer identifications associated with the one or more vehicle dealers. The dealer identifications may include at least one of a dealer name or a dealer address of the one or more vehicle dealers. The dealer identifications may further include contact information (e.g., phone numbers, e-mail addresses, etc.) or additional information pertaining to the one or more vehicle dealers. The additional information pertaining to the vehicle dealers may include reviews or photos of the one or more vehicle dealers.

Step 305 may include comparing, via the one or more processors, the bidding data and the sales data during a predetermined bidding period. The predetermined bidding period may last at least 1 minute, 1 hour, 1 day, 1 week, or longer. In some embodiments, the predetermined bidding period may be at most 1 week, 1 day, 1 hour, 1 minute, or shorter. The predetermined bidding period may be the same length as the bidding process. In some embodiments, the predetermined bidding period may be shorter than the bidding process. The length of the predetermined bidding period may be set by the user or determined by the one or more algorithms. The comparing the bidding data and the sales data during the predetermined bidding period may include comparing the bidding real-time price and the sale prices of the one or more vehicles. The comparing the bidding data and the sales data may include matching the bidding data and the sales data. For instance, if the bidding data includes the bidding real-time price and the sales data includes the sales prices of the one or more vehicles, comparing the bidding data and the sales data may include comparing or matching the bidding real-time price and the sale prices of the one or more vehicles to check whether there is a match (e.g., a complete match or a match equal to or exceeding a predetermined threshold of similarity) between the bidding real-time price and the sale prices.

Step 306 may include determining, via the one or more processors, the vehicle recommendation based on the comparison between the bidding data and the sales data. The vehicle recommendation may include any information regarding one or more recommended vehicles that represent a match (e.g., a complete match or a match equal to or exceeding a predetermined threshold of similarity) between the purchasing power data and the sales data. The vehicle recommendation may include images, prices, modes, makes, years of manufacturing, mileages, colors of the one or more recommended vehicles. The vehicle recommendation may also include any information regarding the one or more dealers who sell the recommended vehicles, including, but not limited to, the names of the dealers or the addresses of the dealers. The vehicle recommendation may also include any information regarding purchasing a vehicle by the user, for example, a recommended location to purchase the vehicle, or a recommended time to purchase the vehicle. The vehicle recommendation may include upgrade or repair information specific to the vehicle, news articles pertaining to the vehicle, possible substitute or compatible items for the vehicle, and so forth. Although a vehicle recommendation is described herein as an example, the methods of the present disclosure can be utilized to provide recommendations for other products. The product may be any item or service sold by a merchant. One or more algorithms may be used to generate the personalized purchasing information (e.g., recommendation). The one or more algorithms may include a trained machine learning algorithm.

At any stage of providing a vehicle recommendation to a user, the method may further include, prior to obtaining the transactional data of the user, authenticating a user identification of the user. Details of such authentication methods are described elsewhere herein. At any stage of providing a vehicle recommendation to a user, the method may further include storing the vehicle recommendation for subsequent analysis. The stored vehicle recommendation may have an expiration period. The expiration period may be at least 1 day, 1 week, 1 month, 1 quarter, 1 year or longer. In other embodiments, the expiration period may be at most 1 year, 1 quarter, 1 month, 1 week, 1 day or shorter. The subsequent analysis may include analyzing the vehicle recommendation to update the transactional data, the purchasing power data, or the sales data. The vehicle recommendation may also be one of the one or more variables used in training a trained machine learning model.

The trained machine learning algorithm may include a regression-based model that accepts the prior transactional data, prior purchasing power data, prior bidding data, prior sales data, and/or prior vehicle recommendations as input data. The trained machine learning algorithm may be part of the algorithm model 112. The trained machine learning algorithm may be of any suitable form, and may include, for example, a neural network. A neural network may be software representing human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include, for example, a convolutional neural network, a deep neural network, or a recurrent neural network.

The trained machine learning algorithm may compute the future transactional data, future purchasing power data, future bidding data, future sales data, and/or the future vehicle recommendations of the user as a function of the prior transactional data, prior purchasing power data, prior bidding data, prior sales data, and/or prior vehicle recommendations, or one or more variables indicated in the input data. The one or more variables may be derived from the prior transactional data, prior purchasing power data, prior bidding data, prior sales data, and/or prior vehicle recommendations. This function may be learned by training the machine learning algorithm with training sets.

The machine learning algorithm may be trained by supervised, unsupervised, or semi-supervised learning using training sets comprising data of types similar to the type of data used as the model input. For example, the training set used to train the model may include any combination of the following: prior transactional data of the user, prior purchasing power data of the user, prior bidding data of the user, prior sales data of the user, prior vehicle recommendations of the user, prior transactional data of customers other than the user, prior purchasing power data of customers other than the user, prior bidding data of customers other than the user, prior sales data of customers other than the user, and/or prior vehicle recommendations of customers other than the user. Additionally, the training set used to train the model may further include user data, including, but not limited to, an actual name, contact information (e.g., address, phone numbers, e-mail addresses, etc.), and other data related to the user. Accordingly, the machine learning model may be trained to map input variables to a quantity or value of vehicle recommendation for the user. That is, the machine learning model may be trained to determine a quantity or value of the vehicle recommendation of the user as a function of various input variables.

The trained machine learning model may utilize principal component analysis (PCA). The PCA may convert a set of variables or input data into a set of values of linearly uncorrelated variables, which include a first principal component that has the largest possible variance. For example, the transactional data, the purchasing power data, the bidding data, or sales data may be converted to a set of variables representing other characteristics of the user. The other characteristics of the user may include the user's relationship with different merchants, the user's health condition, or the user's future financial plans. The PCA may be used to define one or more variables that are more important than other variables, or reduce the number of variables needed to be trained and computed by a machine learning model.

Step 307, similar to step 206, may include transmitting, to the user, a notification indicating the vehicle recommendation. The notification may include any information associated with the vehicle recommendation. The notification may be configured to be displayed on a display screen of a user device associated with the user (e.g., user device 150). The notification may be displayed on the display screen in any suitable form, such as an e-mail, a text message, a push notification, content on a web page, and/or any form of graphical user interface. The user device 150 may be capable of accepting inputs of a user via one or more interactive components of the user device 150, such as a keyboard, button, mouse, touchscreen, touchpad, joystick, trackball, camera, microphone, or motion sensor.

In general, any process discussed in this disclosure that is understood to be computer-implementable, such as the processes illustrated in FIGS. 2-3, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 110, may include one or more computing devices. If the one or more processors of the computer system 110 are implemented as a plurality of processors, the plurality of processors may be included in a single computing device or distributed among a plurality of computing devices. If a computer system 110 comprises a plurality of computing devices, the memory of the computer system 110 may include the respective memory of each computing device of the plurality of computing devices.

Figure 4:
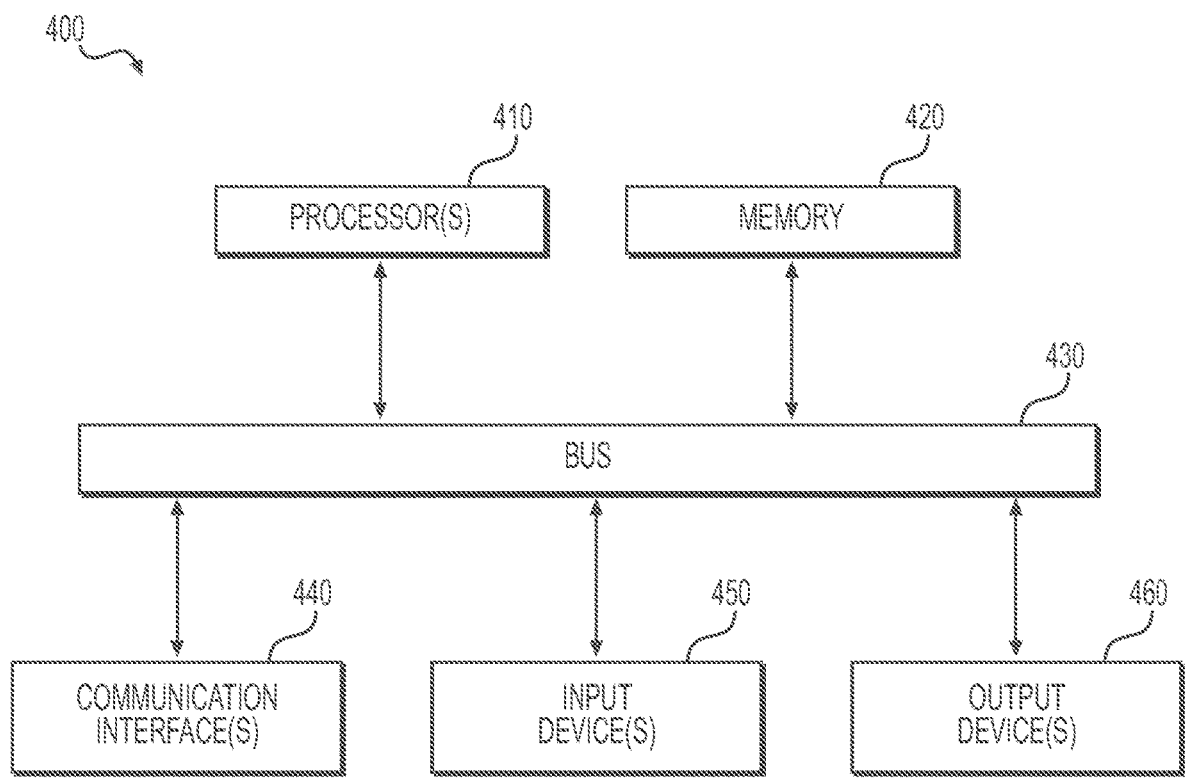
FIG. 4 depicts an example of a computing device, according to one or more embodiments.

FIG. 4 illustrates an example of a computing device 400 of a computer system, such as computer system 110. The computing device 400 may include processor(s) 410 (e.g., CPU, GPU, or other such processing unit(s)), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses. In some embodiments, the processor(s) 410 of the computing device 400 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for providing an item recommendation for a user, the method comprising:
    obtaining, via one or more processors, transactional data of the user and prior transactional data of a plurality of users from one or more transactional entities, wherein the transactional data comprises at least one of an income pattern or a spending pattern of the user;
    determining, via the one or more processors, a payment goal of the user based on one or more inputs provided via one or more interactive components of a user device, wherein the one or more inputs include a personalized payment amount defined by the user;
    determining, via the one or more processors, purchasing power data of the user based on the transactional data and the payment goal, and prior purchasing power data of the plurality of users based on the prior transactional data, wherein the purchasing power data comprises at least an item price range;
    determining, via the one or more processors based on the purchasing power data, bidding data including at least a bidding starting price and a bidding increment amount;
    obtaining, via the one or more processors, sales data of one or more items, wherein the sales data of the one or more items comprises sale prices of the one or more items;
    comparing, via the one or more processors, the bidding data and the sales data during a predetermined bidding period;
    determining, via use of a trained machine learning model, the item recommendation based on at least one mapped variable, the trained machine learning model having an input layer to receive the bidding data, an internal layer that upon receipt from the input layer maps the bidding data to at least one variable based on the comparing of the bidding data to the sales data, and an output layer to map the at least one variable to a monetary value of the item recommendation as a function of the internal layer; and
    transmitting, to the user device, a notification indicating the item recommendation.

2. The computer-implemented method of claim 1, wherein the transactional data further includes a debt, a loan, an additional income, or a credit score of the user.

3. The computer-implemented method of claim 1, wherein the one or more transactional entities include one or more merchants including one or more item vendors, financial services providers, or online resources.

4. The computer-implemented method of claim 3, wherein the one or more transactional entities include the one or more item vendors, and wherein the sales data of the one or more items further includes one or more vendor identifications associated with the one or more item vendors.

5. The computer-implemented method of claim 3, wherein the one or more transactional entities include the one or more item vendors, the computer-implemented method further including transmitting, to the one or more item vendors, the notification indicating the item recommendation.

6. The computer-implemented method of claim 1, wherein the purchasing power data further includes demographic information of the user.

7. The computer-implemented method of claim 1, wherein mapping the bidding data to the at least one variable includes comparing the item price range of the user, the personalized payment amount of the user, and the sale prices of the one or more items.

8. The computer-implemented method of claim 1, further including, prior to obtaining the transactional data of the user, authenticating a user identification of the user.

9. A computer system for providing an item recommendation to a user, comprising:
    a memory storing instructions; and
    one or more processors configured to execute the instructions to perform operations including:
        obtaining-transactional data of the user and prior transactional data of a plurality of users from one or more transactional entities, wherein the transactional data comprises at least one of an income pattern or a spending pattern of the user;
        determining a payment goal of the user based on one or more inputs provided via one or more interactive components of a user device, wherein the one or more inputs include a personalized payment amount defined by the user;
        determining purchasing power data of the user based on the transactional data and the payment goal, and prior purchasing power data of the plurality of users based on the prior transactional data, wherein the purchasing power data comprises at least an item price range;
        determining, based on the purchasing power data, bidding data including at least a bidding starting price and a bidding increment amount;
        obtaining data of one or more items, wherein the sales data of the one or more items comprises sale prices of the one or more items;
        comparing the bidding data and the sales data during a predetermined bidding period;
        determining, via use of a trained machine learning model, the item recommendation based on at least one mapped variable, the trained machine learning model having an input layer to receive the bidding data, an internal layer that upon receipt from the input layer maps the bidding data to at least one variable based on the comparing of the bidding data to the sales data, and an output layer to map the at least one variable to a monetary value of the item recommendation as a function of the internal layer; and
        transmitting, to the user device, a notification indicating the item recommendation.

10. The computer system of claim 9, wherein the transactional data further includes a debt, a loan, an additional income, or a credit score of the user.

11. The computer system of claim 9, wherein the one or more transactional entities include one or more merchants including one or more item vendors, financial services providers, or online resources.

12. The computer system of claim 11, wherein the one or more transactional entities include the one or more item vendors, and wherein the sales data of the one or more items further includes one or more dealer identifications associated with the one or more item vendors.

13. The computer system of claim 11, wherein the one or more transactional entities include the one or more item vendors, the operations further including transmitting, to the one or more item vendors, the notification indicating the item recommendation.

14. The computer system of claim 9, wherein the purchasing power data further includes demographic information of the user.

15. The computer system of claim 9, wherein mapping the bidding data with the at least one variable includes comparing the item price range of the user, the personalized payment amount of the user, and the sale prices of the one or more items.

16. The computer system of claim 9, further including, prior to obtaining the transactional data of the user, authenticating a user identification of the user.

17. A computer-implemented method for providing an item recommendation, the method comprising:

obtaining, via one or more processors, transactional data of a user and prior transactional data of a plurality of users from one or more transactional entities, wherein the one or more transactional entities include one or more merchants including one or more item vendors, financial services providers, or online resources, and wherein the transactional data comprises at least one of an income pattern or a spending pattern of the user;

determining, via the one or more processors, a payment goal of the user based on one or more inputs provided via a user device, wherein the one or more inputs include a personalized payment amount defined by the user;

determining, via the one or more processors, purchasing power data of the user based on the transactional data and the payment goal, and prior purchasing power data of the plurality of users based on the prior transactional data, wherein the purchasing power data comprises an item price range;

determining, via the one or more processors based on the purchasing power data, bidding data including at least a bidding starting price and a bidding increment amount;

obtaining, via the one or more processors, sales data of one or more items, wherein the sales data of the one or more items includes sale prices of the one or more items;

comparing, via the one or more processors, the bidding data and the sales data during a predetermined bidding period;

determining, via use of a trained machine learning model, the item recommendation based on at least one mapped variable, the trained machine learning model having an input layer to receive the bidding data, an internal layer that upon receipt from the input layer maps the bidding data to at least one variable, and an output layer to map the at least one variable to a monetary value of the item recommendation; and transmitting, to the user device, a notification indicating the item recommendation.

18. The computer-implemented method of claim 17, wherein the one or more transactional entities include the one or more item vendors, and wherein the sales data of the one or more items further includes one or more vendor identifications associated with the one or more item vendors.

19. The computer-implemented method of claim 17, wherein the one or more transactional entities include the one or more item vendors, the computer-implemented method further including transmitting, to the one or more item vendors, the notification indicating the item recommendation.

20. The computer-implemented method of claim 17, wherein mapping the bidding data with the at least one variable includes comparing the item price range of the user, the personalized payment amount of the user, and the sale prices of the one or more items.

* * * * *